United States Patent [19]

Howson

[11] E Re. 30,182

[45] Reissued Dec. 25, 1979

[54] PRECODED TERNARY DATA TRANSMISSION

[75] Inventor: Robert D. Howson, Red Bank, N.J.

[73] Assignee: Bell Telephone Laboratories, Incorporated, Murray Hill, N.J.

[21] Appl. No.: 490,360

[22] Filed: Jul. 22, 1974

Related U.S. Patent Documents

Reissue of:

[64] Patent No.: 3,679,977
Issued: Jul. 25, 1972
Appl. No.: 835,984
Filed: Jun. 24, 1969

[51] Int. Cl.[2] ..... H04B 1/62; H04B 1/66

[52] U.S. Cl. ..... 325/42; 325/38 A; 340/347 DD

[58] Field of Search ..... 340/347 DD, 146.1 AB, 340/146.1 D; 325/38 A, 323; 179/15 AE, 15 BS

[56] References Cited

U.S. PATENT DOCUMENTS

| | | | |
|---|---|---|---|
| 3,175,157 | 3/1965 | Mayo et al. | 179/15 |
| 3,492,578 | 1/1970 | Gerrish et al. | 325/42 |
| 3,518,662 | 6/1970 | Nakogome et al. | 340/347 DD |

*Primary Examiner*—Thomas J. Sloyan
*Attorney, Agent, or Firm*—Joseph P. Kearns

[57] ABSTRACT

A digital data transmission rate of three bits per cycle of bandwidth is achieved in precoded partial-response band-limited communication channels by partitioning binary digits into groups of three two-level digits and translating these binary groups of three into pairs of three-level digits prior to transmission. Correct pairwise association of received signals is accomplished by reserving a three-level digit pair for monitoring purposes. This reserved pair can validly occur only at a transition between allowable pairs. By monitoring the presence of the reserved pair, correct pairwise association of ternary digits is assured and binary digits are properly decoded without having to provide a special framing signal.

10 Claims, 8 Drawing Figures

PRECODED TERNARY DATA TRANSMISSION

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to high-speed transmission of digital data over transmission channels of limited bandwidth. In particular, a transmission rate of three bits per cycle of bandwidth is attained in communication channels whose signal-to-noise ratio limits the number of transmitted levels that can be reliably distinguished in a multilevel channel signal.

2. Description of the Prior Art

In U.S. Pat. No. 3,388,330, issued to E. R. Kretzmer on June 11, 1968, the concept of communication channel shaping to effect controlled correlation between received signal samples is introduced. Such controlled signal shaping is called partial-response shaping because the impulse response to each signal input is so related to the signaling interval that the response within a signaling interval is only partial. The result is that intersymbol interference is allowed to occur, but it is structured in such a way that the binary significance of individual samples of the received signal is preserved. Symbol speeds at the maximum theoretical rate of two symbols per second per Hertz of bandwidth and the corresponding binary bit rate of two bits per second per Hertz are thus readily obtained in practical communication channels.

In my copending joint patent application with A. M. Gerrish, Ser. No. 639,870, filed May 19, 1967, Now U.S. Pat. No. 3,492,578 issued Jan. 27, 1970, it is further disclosed that by combining multilevel (more than two levels per symbol) signaling with partial-response encoding an equivalent binary signaling speed in excess of two bits per second per Hertz of channel bandwidth can be attained. Specifically, a speed $\log_2 N$ bits per channel symbol is possible for N input levels per symbol. With the maximum partial-response symbol rate of two symbols per second per Hertz this gives a bit rate of $2 \log_2 N$ bits per second per Hertz.

Practically, N appeared to be restricted to powers of two so that an integral number $m(m=\log_2 N)$ of binary input digits would be encoded on each level and so that there would be a direct correspondence between the N levels of the multilevel signal and the N possible combinations of the m binary digits. However, with partial-response encoding, the N baseband levels generate (2N−1) channel levels. Moreover, for each increase in the number of channel levels there is a signal-to-noise penalty that in many practical communication channels prohibits four-level baseband operation.

It is an object of this invention to adapt the partial-response principle to attain a speed capability for data transmission at rates of m bits per symbol, such that m is no longer restricted to being a positive integer, i.e., the binary signaling rate is a nonintegral multiple of the channel baud rate.

It is another object of this invention to increase the equivalent binary data transmission rate of a synchronous digital transmission system without changing the synchronous channel symbol rate itself.

SUMMARY OF THE INVENTION

According to this invention, binary digital data signals generated at a speed greater than the symbol rate of a synchronously timed, band-limited channel over which transmission is to occur are processed for transmission over such channel without changing its synchronous timing. The resultant equivalent binary transmission rate becomes a nonintegral multiple of the channel symbol rate.

In general, binary signals generated at a rate not exceeding $\log_2 N$ times the symbol rate of a communication channel are transformed into N-level signals by mapping first blocks of binary or two-level digits of length m into second blocks of N-level digits of length n. The values of m, N and n are selected such that $2^m$ is less than $n^n$, N is an integer that is not a power of two, and there is at least one unassigned N-level second block. The N-level digits of the second block are applied to the channel of bandwidth W at the maximum theoretical baud rate of 2W symbols per second, thus forming a (2N−1)-level channel signal with an information rate of $\log_2 N$ bits per symbol precoded in accordance with the inverse of the channel impulse response, and the transmitted N-level digits are recoverable by a modulo-N reduction from single samples. The occurrence of an unassigned N-level second block of length n at the receiver is used as a basis for proper synchronization of second blocks before decoding the original binary signals.

In an illustrative embodiment binary input signals are transformed into ternary signals, precoded for compatibility with partial-response signal shaping, and applied to a partial-response channel. Specifically, for m and N equal to 3 and n equal to 2, binary input signals are partitioned into first groups of three two-level digits and each such first group is translated into a preassigned second group comprising pairs of three-level digits. The second groups of three-level digits occur at the selected synchronous symbol rate of the partial-response channel. Because there are more available permutations of three-level or ternary digits taken two at a time, i.e., $3^2=9$, than there are permutations of two-level digits taken three at a time, i.e., $2^3=8$, one three-level digit pair can be reserved for marking the required partitioning of received pairs for decoding purposes with minimum redundancy. In the illustrative embodiment a channel bandwidth W equal to 36 kilohertz transmits 108-kilohertz binary signals at a baud rate of 72 kilohertz.

In addition to the partitioning of binary input signals and their translation into ternary digits, logic operations are performed on the ternary digits to precode them for partial-response transmission whereby five-level channel signals can be decoded modulo-three at single sampling instants. The five-level channel signal results from the application of successive ternary digits to an exemplary partial-response channel at the symbol rate 2W.

At a receiver for the incoming partial-response signal analog-to-digital slicing and logic operations recover the ternary digits. Successive ternary digits are monitored in pairs for the occurrence of the unassigned pair in a block synchronizer. A timing wave generated at the block frequency, i.e., half the channel frequency for the exemplary case, is left undisturbed as long as the forbidden pair occurs as the last digit of one block and the first digit of the succeeding block. However, an overflow counter is provided to tally the number of times the unassigned pair occurs in the center of a block of two ternary digits. Upon overflow the block timing wave is retarded by half a cycle to restore correct block synchronization. Regeneration of the binary triplets from the ternary doublets then proceeds in logical fashion.

In order to simplify the handling of ternary digits binary encoding is used throughout. Accordingly, it is a feature of the invention that two binary digits encode each ternary digit in such a way that the sum of the binary digits becomes the equivalent of each ternary level. Thus, conventional binary logic elements can be employed.

It is another feature of the invention that a binary data sequence occurring at a rate not integrally related to the channel rate can be transmitted without altering the channel rate and at the same time an overall transmission rate compatible with signal-to-noise ratios available in practical channels can be achieved.

DESCRIPTION OF THE DRAWING

The several objects, features and advantages of this invention will be more fully appreciated by a consideration of the following detailed description and the drawing in which.

DETAILED DESCRIPTION

Figure 1:
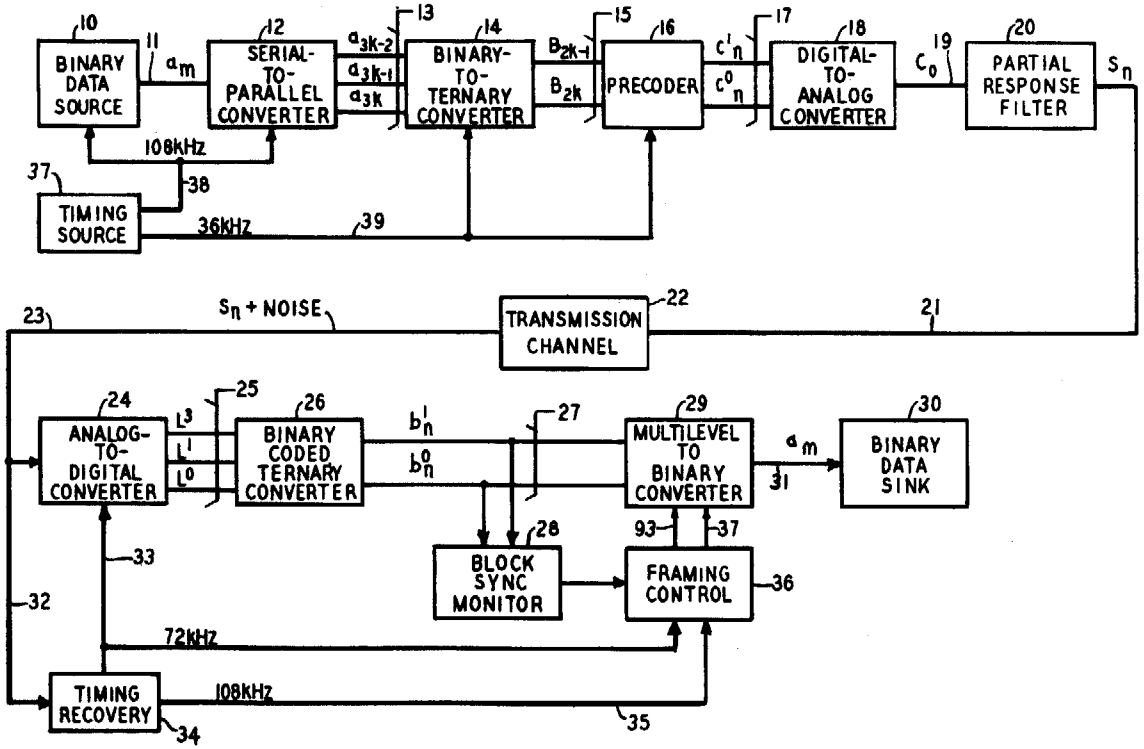
FIG. 1 is a block diagram of a partial-response data transmission system which achieves an overall equivalent binary transmission rate in bits of 3 times the channel bandwidth according to this invention.

According to the partial-response concept disclosed in the cited Kretzmer patent, a channel having an available bandwidth W is excited at the theoretical maximum signaling rate of 2W symbols per second. Where the channel does not have ideal shaping, i.e., a flat amplitude-frequency characteristic with absolute cutoff at both upper and lower band edges, and a linear phase-frequency characteristic, intersymbol interference necessarily results. Accordingly, the channel response to each impulse is dispersed over more than one signaling interval of duration (1/(2W) second and a plurality of received samples must ordinarily be correlated in order to recover the original transmitted sequence. As part of the partial-response concept, the channel statistics can be predetermined and controlled in such a way that the channel dispersion can be compensated in advance of transmission by precoding. In the type of partial-response signal shaping that Kertzmer has designated Class IV the channel is shaped such that its response to each impulse includes two symmetrical nonzero components of opposite polarity spread over three signaling intervals with the center interval having a zero response. This class of partial-response shaping has found favor because its average direct-current component is zero, and the signal spectrum has zero transmission at both band edges without sharp, difficult-to-realize cutoffs.

If the channel signal is designated $S_n$ at an arbitrary sampling instant n and results from the application of an impulse $C_n$ to such channel, then according to the Class IV partial-response shaping, $$S_n = C_n - C_{n-2}. \quad (1)$$

The $C_n$ components are typically multilevel at N levels and the $S_n$ components then have (2N-1) levels. The receiver for the signal $S_n$ would normally correlate samples taken at alternate signaling intervals. However, $C_n$ may advantageously be precoded from another multilevel signal $B_n$ by addition of the $C_{n-2}$ component thereto. Thus, $$C_n = (B_n + C_{n-2}) \bmod N. \quad (2)$$

Addition modulo-N (mod N) signifies casting out multiples of N from the sum and recording only the excess thereover. This is analogous to determining that 3 p.m. is 4 fours after 11 a.m. by substracting N=12 from the sum of 11 and 4.

If the $C_n$ components are derived from some basic signal $B_n$in accordance with equation (2), then $$B_n = S_n \bmod N. \quad (3)$$

Consequently, $B_n$ can be decoded at a receiver by a memoryless detector from single samples of the received signal $S_n$.

Kretzmer disclosed how equations (1), (2) and (3) can be implemented for N=2, in which case $S_n$ would have three levels. In my cited copending application there is disclosed how these equations can be implemented for $N=2^m$, where m is an integer. As long as m is an integer there is a one-to-one correspondence between the N signal levels and integral numbers m of binary digits. Unfortunately, for N=4 seven levels are required on the channel and many practical channels do not possess a low enough signal-to-noise ratio to permit reliable decisions among so many levels. However, it has been determined that five channel levels can be reliably distinguished in widely available telephone carrier channels. Five partial-response channel levels assume three coding levels, hereinafter referred to as ternary. Ternary coding further presupposes one and one-half binary signal bits per coding level, on the average.

This invention is addressed to the implementation of equations (1), (2) and (3) broadly for the case where N is an integer not a power of two and, by way of specific example, where N=3. Because of the absence of direct correspondence between coding levels and binary inputs partitioning of a binary signaling sequence is required as is explainable in connection with FIG. 2.

Figure 2:
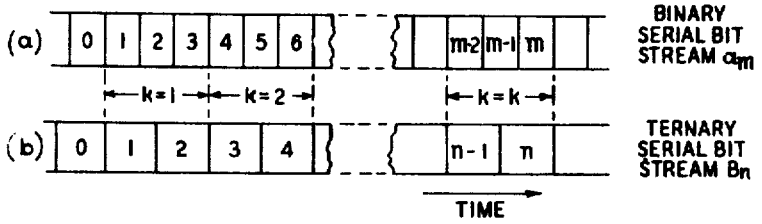
FIG. 2 is a timing diagram of aid in explaining binary-to-ternary signal translation according to this invention.

Line (a) of FIG. 2 is diagrammatic of a binary serial bit stream $a_m$ of data moving from right to left (time is increasing to the right). In each equal signaling interval 0 through m an impulse is generated on one of two logic levels 1 or 0, which may advantageously be respective positive and negative potentials. These intervals are partitioned into k groups of three with the groups designated by the integer k as shown. For $k=1$, binary intervals 1, 2 and 3 occur; for $k=2$, intervals 4, 5 and 6; and for $k=k$, intervals $m-2=3k-2$, $m-1=3k-1$ and $m=3k$ occur.

Line (b) OF FIG. 2 shows a group of equal signaling intervals 0 through n, which are exactly one and one-half times the duration of the intervals on line (a), e.g., interval 1 on line (b) is one and one-half times the duration of interval 1 on line (a). These intervals are partitioned into k groups of two, in exact correspondence with the k groups of three on line (a). For $k=1$ intervals 1 and 2 occur; for $k=2$, intervals 3 and 4; and for $k=k$, intervals $n-1=2k-1$ and $n=2k$. In each interval a ternary signal will be generated at one of three logic levels 0, 1 and 2, which may advantageously be respective negative, zero and positive potential levels. By way of specific example, the triplets of line (a) are mapped to the doublets of line (b) according to Table A.

TABLE A

| $a_{3k-2}$ | $a_{3k-1}$ | $a_{3k}$ | $B_{2k-1}B_{2k}$ | $b_{2k-1}^1$ | $b_{2k-1}^0$ | $b_{2k}^1$ | $b_{2k}^0$ |
|---|---|---|---|---|---|---|---|
| 0 | 0 | 0 | 1 0 | 0 | 1 | 0 | 0 |
| 0 | 0 | 1 | 1 1 | 0 | 1 | 0 | 1 |
| 0 | 1 | 0 | 2 1 | 1 | 1 | 0 | 1 |
| 0 | 1 | 1 | 0 1 | 0 | 0 | 0 | 1 |
| 1 | 0 | 0 | 2 0 | 1 | 1 | 0 | 0 |
| 1 | 0 | 1 | 0 0 | 0 | 0 | 0 | 0 |
| 1 | 1 | 0 | 2 2 | 1 | 1 | 1 | 1 |
| 1 | 1 | 1 | 0 2 | 0 | 0 | 1 | 1 |
| X | X | X | 1 2 | 0 | 1 | 1 | 1 |

The first three columns represent the eight possible permutations of binary triplets and the next two columns are the translated ternary doublets. It is seen that there are nine possible ternary pairs, and only eight possible binary triplets. The 1-2 ternary pair in the last row (indicated by X's) does not correspond to any binary triplet and therefore is a violation of the selected coding. This pair can only validly occur between ternary groups, a circumstance which will be used to advantage at the receiver to preserve the correct pairwise association of ternary doublets. The coding is entirely arbitrary but is selected to optimize the error performance of the transmission system.

Since components and circuits for handling binary digits are more readily available than circuits for handling ternary digits, the ternary digits are encoded binary fashion as shown in the last four columns. The columns headed $b_{2k-1}^1$ and $b_{2k-1}^0$ are the binary equivalents of the ternary digits $B_{2k-1}$, the superscripts 1 and 0 indicating respectively the most and least significant binary digits. Similarly, the columns headed $b_{2k}^1$ and $b_{2k}^0$ are the binary equivalents of ternary digits in the column headed $B_{2k}$.

The following logic equations summarize the binary coding of the ternary digits:

$$b_{2k-1}^1 = \overline{a_{3k}} \cdot (a_{3k-1} + a_{3k-2}) \quad (4)$$

$$b_{2k-1}^0 = b_{2k-1}^1 + \overline{a_{3k-1}} \cdot \overline{a_{3k-2}} \quad (5)$$

$$b_{2k}^1 = a_{3k-1} \cdot a_{3k-2} \quad (6)$$

$$b_{2k}^0 = a_{3k} \cdot \overline{a_{3k-2}} + a_{3k-1} \quad (7)$$

$$B_i = \begin{cases} 0 \text{ for } b_i^1 = b_i^0 = 0 \\ 1 \text{ for } b_i^1 = 0;\ b_i^0 = 1. \\ 2 \text{ for } b_i^1 = b_i^0 = 1 \end{cases}$$

Equations (4) through (7) are derived by induction from table A. Equation (8) indicates how the ternary digit is the sum of its binary-coded levels.

Precoding is facilitated by the use of binary-encoded ternary digits as will be more fully discussed in connection with the description of FIG. 4.

FIG. 1 is a block diagram of a complete partial response data transmission system using ternary coding according to this invention. For purposes of specificity it is assumed that the bandwidth of channel 22 is 36 kilohertz, that the channel is of the type used in telephone carrier systems, that the channel signaling rate is 72 kilobauds per second and that the binary signaling rate is 108 kilobits per second.

The data transmission system comprises a transmitter including elements 10 through 20 and timing source 37, transmission channel 22 and a receiver including elements 24 through 36.

Figure 8:
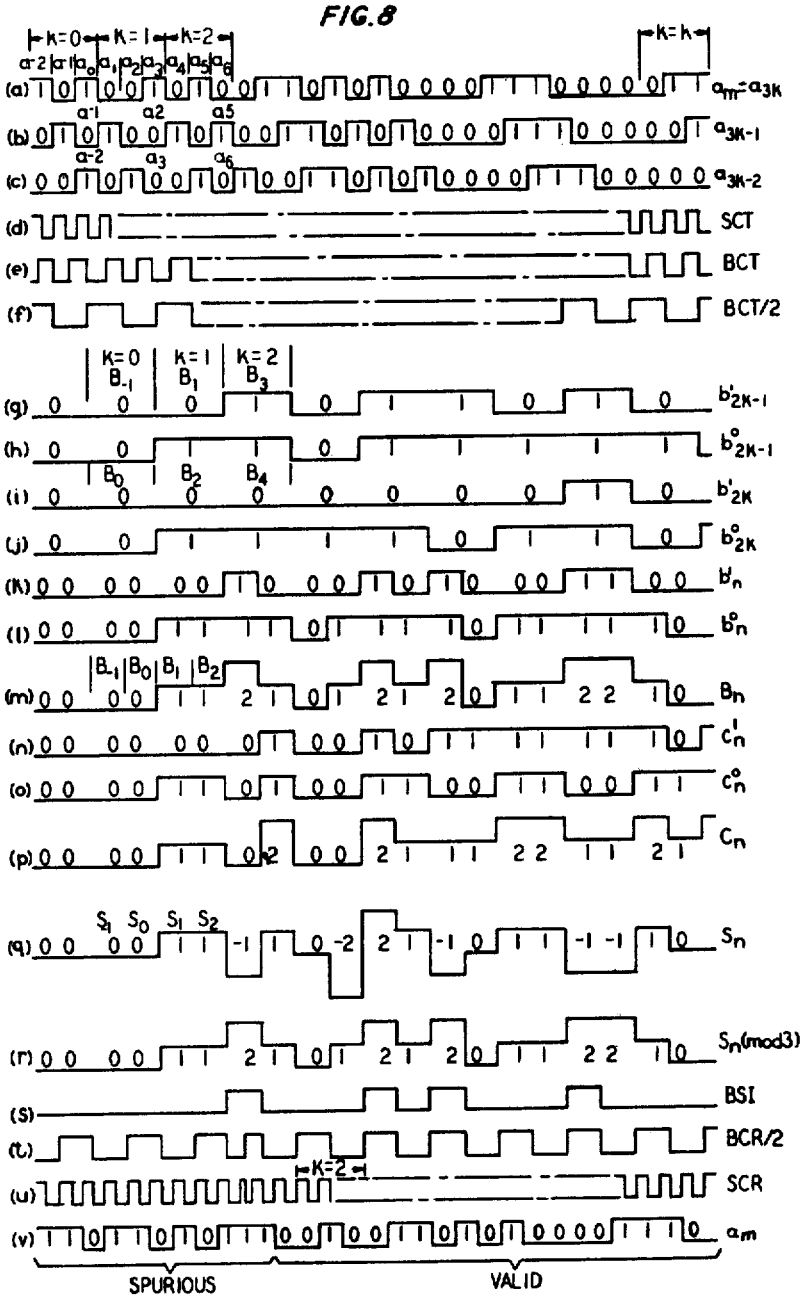
FIG. 8 are waveforms generated throughout the data transmission system of this invention in response to a representative input binary data sequence.

The transmitter portion comprises serial binary data source 10, serial-to-parallel converter 12, binary-to-ternary converter 14, precoder 16, digital-to-analog converter 18 and partial-response filter 20. Data source 10 generates serial binary data under the timing control of timing source 37 by way of lead 38 at the exemplary rate of 108 kilohertz. A representative serial data stream $a_m$ is shown on line (a) of waveform diagram FIG. 8. Line (d) of FIG. 8 shows the serial clock timing (SCT) stream from timing source 37. Serial data from source 10 is transformed in groups of three to parallel form in converter 12 and the parallel outputs appear on leads 13 as labeled. Lines (a), (b) and (c) of FIG. 8 indicate the respective outputs for the representative data stream.

Binary-to-ternary converter 14 operates on the parallel outputs on leads 13 in accordance with equations (4) through (7) to produce binary encoded ternary digits on output leads 15. The binary encoded equivalents of the representative data stream appear on lines (g) through (j) of FIG. 8. Lines (e) and (f) of FIG. 8 show the respective baud (symbol) clock timing (BCT) and BCT/2 waves generated conventionally in timing source 37. Timing source 37 may advantageously include a 432 kilohertz crystal oscillator driving respective divide-by-four and divide-by-six countdown chains to produce the required SCT and BCT timing waves.

Precoder 16 operates on the binary-coded ternary digits on leads 15 in accordance with equation (2) evaluated for $N=3$. Precoded ternary digits $C_n$ represented by pairs of precoded binary digits $C_n^1$ and $C_n^0$ on parallel output leads 17 [lines (n) and (o) of FIG. 8] are converted to serial analog form in converter 18 in conventional fashion. Precoded binary-coded ternary digits $C_n$ thus presented on lead 19 are applied to partial-response filter 20 where, due to the dispersion effect, five-level line signals $S_n$ are created. Partial-response filter 20 is designed to impart to transmission channel 22 a spectral shaping in accordance with Kretzmer's teachings which is dome-shaped, as shown in his FIG. 23b. Signals $C_n$ and $S_n$ for the exemplary data sequence are shown on lines (p) and (q) of FIG. 8. Wave $C_n$ is a summation of $c_n^1$ and $c_n^0$ and thus has three levels designated 0, 1 and 2. Wave $S_n$ results from taking the difference of the present $C_n$ level and the twice-delayed $C_{n-2}$ level in accordance with equation (2).

Before turning to the receiver and the block framing problem, specific implementations of blocks 12, 14, 16 and 18 of FIG. 1 are discussed.

Figure 3:
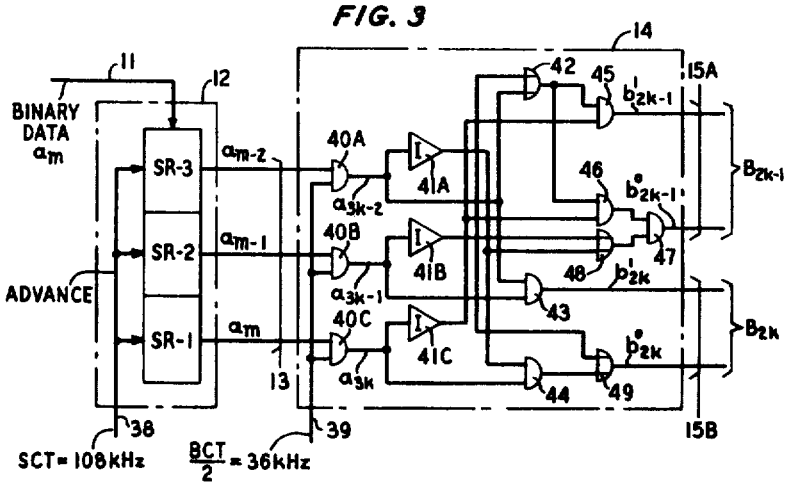
FIG. 3 is a logical block diagram of an illustrative embodiment of a binary-to-ternary converter useful in the practice of this invention.

FIG. 3 is a detailed logic diagram of an illustrative embodiment of serial-to-parallel converter 12 and binary-to-ternary converter 14. Serial-to-parallel converter 12 comprises a three-stage shift register having at its input the serial binary data sequence $a_m$ on line 11, an advance lead 38 supplied with SCT timing at the 108 kilohertz rate, and output leads 13 from the individual shift register stages. At any given instant three consecutive serial data bits will be stored in the respective shift register stages SR-1, SR-2 and SR-3. The bit stored in stage SR-1 is considered the present bit $a_m$, as represented on line (a) of FIG. 8. Stages SR-2 and SR-3 store the remaining bits $a_{m-1}$ and $a_{m-2}$ as shown on lines (b) and (c) of FIG. 8. These lines are seen to be identical except for the time difference, so that at times m=3,6, . . . , 3k three consecutive input digits are in parallel time coincidence for application to binary-to-ternary converter 14. The SCT wave is shown on line (d) of FIG. 8.

At the input of converter 14 leads 13 connect through AND-gates 40 to a logic matrix. A timing wave BCT/2 at 36 kilohertz, as shown on line (f) of FIG. 8, has a positive transition every three bits of the $a_m$ data wave. Applied to AND-gates 40 by way of lead 39, this timing wave admits samples of the signals on parallel leads 13 to the logic matrix in broken-line box 14. This matrix implements equations (4) through (7) and TABLE A. Thus, the outputs of AND-gates 40A, 40B and 40C are respectively designated $a_{3k-2}$, $a_{3k-1}$ and $a_{3k}$.

Specifically, direct data samples and data samples inverted by inverters 41 are applied as shown to further AND-gates 43 through 46 and OR-gates 42, 48 and 49. In addition the outputs of AND-gates 46 and OR-gate 48 are combined in AND-gate 47. The ultimate outputs on lead pairs 15A and 15B are two binary-coded ternary digits $B_{2k-1}$ and $B_{2k}$. These digits are shown in their binary coded forms on lines (g) through (j) of FIG. 8. The operation of the logic matrix is straightforward and is readily followed by one skilled in the art. For example, the more significant binary component $b_{2k}^1$ of ternary digit $B_{2k}$ results from the logical summation of binary data digits $a_{3k-2}$ and $a_{3k-1}$ in AND-gate 43, in accordance with equation (6). Similarly, the associated binary component $b_{2k}^0$ of ternary digit $B_{2k}$ appears at the output of OR-gate 49 as either the data digit $a_{3k-1}$ (if it is a 1) or the logical summation of the inverted $a_{3k-2}$ data digit and the direct $a_{3k}$ data digit, in accordance with equation (7). The $B_{2k-1}$ digits are derived in accordance with equations (4) and (5) in the same way.

Figure 4:
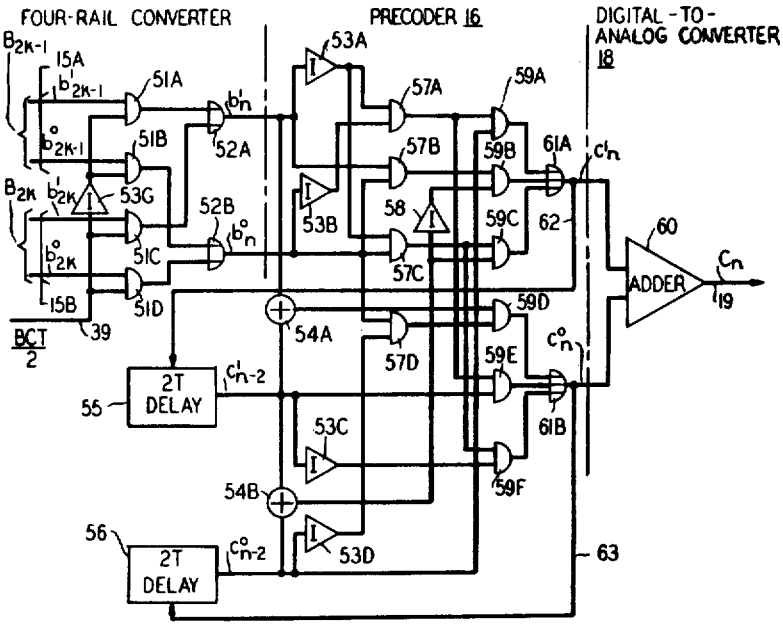
FIG. 4 is a logical block diagram of a ternary partial-response precoder combined with a digital-to-analog converter useful in the practice of this invention.

FIG. 4 is a logic diagram of an illustrative embodiment of precoder 16 and digital-to-analog converter 18 of FIG. 1.

The following TABLE B can be constructed in implementation of equation (2) and the convention adopted respecting the binary encoding of ternary digits: namely, ternary 0 is represented by the binary digit pair 00; ternary 1, by binary 01 or 10; and ternary 2, by binary 11. Allowing ternary 1 in the precoded digits $C_n$ to be represented by both the binary pairs 01 and 10 simplifies the logic.

[TABLE B

| Ternary Digits | | | | Binary Digits | | | | |
|---|---|---|---|---|---|---|---|---|
| $B_n$ | $C_{n-2}$ | $C_m$ | $B^1_n$ | $b^0_n$ | $c^1_{n-2}$ | $c^0_{n-2}$ | $c^1_n$ | $C^0_n$ |
| 0 | 0 | 0 | 0 | 0 | 0 | 0 | 0 | 0 |
| 0 | 1 | 1 | 0 | 0 | 0 | 1 | 1 | 0 |
| 0 | 1 | 1 | 0 | 0 | 1 | 0 | 0 | 1 |
| 0 | 2 | 2 | 0 | 0 | 1 | 1 | 1 | 1 |
| 1 | 0 | 1 | 0 | 1 | 0 | 0 | 0 | 1 |
| 1 | 1 | 2 | 0 | 1 | 0 | 1 | 1 | 1 |
| 1 | 1 | 2 | 0 | 1 | 1 | 0 | 1 | 1 |
| 1 | 2 | 0 | 0 | 1 | 1 | 1 | 0 | 0 |
| 2 | 0 | 2 | 1 | 1 | 0 | 0 | 1 | 1 |
| 2 | 1 | 0 | 1 | 1 | 0 | 1 | 0 | 0 |
| 2 | 1 | 0 | 1 | 1 | 1 | 0 | 0 | 0 |
| 2 | 2 | 1 | 1 | 1 | 1 | 1 | 1 | 0] |

*TABLE B*

| *TERNARY DIGITS* | | | *BINARY DIGITS* | | | | | |
|---|---|---|---|---|---|---|---|---|
| $B_n$ | $C_{n-2}$ | $C_n$ | $b^1_n$ | $b^0_n$ | $c^1_{n-2}$ | $c^0_{n-2}$ | $c^1_n$ | $c_n$ |
| 0 | 0 | 0 | 0 | 0 | 0 | 0 | 0 | 0 |
| 0 | 1 | 1 | 0 | 0 | 0 | 1 | 1 | 0 |
| 0 | 1 | 1 | 0 | 0 | 1 | 0 | 0 | 1 |
| 0 | 2 | 2 | 0 | 0 | 1 | 1 | 1 | 1 |
| 1 | 0 | 1 | 0 | 1 | 0 | 0 | 0 | 1 |
| 1 | 1 | 2 | 0 | 1 | 0 | 1 | 1 | 1 |
| 1 | 1 | 2 | 0 | 1 | 1 | 0 | 1 | 1 |
| 1 | 2 | 0 | 0 | 1 | 1 | 1 | 0 | 0 |
| 2 | 0 | 2 | 1 | 1 | 0 | 0 | 1 | 1 |
| 2 | 1 | 0 | 1 | 1 | 0 | 1 | 0 | 0 |
| 2 | 1 | 0 | 1 | 1 | 1 | 0 | 0 | 0 |
| 2 | 2 | 1 | 1 | 1 | 1 | 1 | 1 | 0 |

The first three columns headed by $B_n$, $C_{n-2}$ and $C_n$ represent ternary digits. Subscript n represents the present digit and subscript n-2, the precoded digit which occurred two signaling intervals previously. The columns headed by $b_n^1$ and $b_n^0$ are the respective most and least significant binary digits encoding the ternary digit $B_n$. Similarly, the columns headed $c_{n-2}^1$ and $c_{n-2}^0$ are the binary digits encoding ternary digit $C_{n-2}$; and the columns headed $c_n^1$ and $c_n^0$ are the binary digits encoding ternary digit $C_n$. It will be noted that rows 2 and 3, 6 and 7, and 10 and 11 are duplicates except for the alternate binary encoding of the ternary digit 1.

By standard techniques logic equations can be written row by row for the binary entries in TABLE B wherever a 1 occurs in the $c_n^1$ or $c_n^0$ column. Row 2 can be represented as $$c_n^1 = \overline{b_n^1} \cdot \overline{b_n^0} \cdot \overline{c_{n-2}^1} \cdot c_{n-2}^0,$$

which is interpreted to mean that $c_n^1 = 1$ can result from the logical ANDing of the complements of $b_n^1$, $b_n^0$ and $c_{n-2}^1$ with the uncomplemented $c_{n-2}^0$. The remaining rows can be similarly represented. Thus, for all rows in which $c_n^1 = 1$, the following logic equation can be written:

$$\begin{aligned} c_n^1 = {} & \overline{b_n^1 b_n^0 c_{n-2}^1} c_{n-2}^0 + \overline{b_n^1 b_n^0} c_{n-2}^1 c_{n-2}^0 \\ & + \overline{b_n^1} b_n^0 \overline{c_{n-2}^1} c_{n-2}^0 \\ & + \overline{b_n^1 b_n^0} c_{n-2}^1 \overline{c_{n-2}^0} + b_n^1 b_n^0 \overline{c_{n-2}^1 c_{n-2}^0} \\ & + b_n^1 b_n^0 c_{n-2}^1 c_{n-2}^0 \end{aligned} \tag{9}$$

Equation (9) simplifies by standard techniques to $$c_n^1 = \overline{b_n^1 b_n^0} c_{n-2}^0 + \overline{b_n^1} b_n^0 (c_{n-2}^1 \oplus c_{n-2}^0) +$$

$$b_n^1 b_n^0 \overline{(c_{n-2}^1 \oplus c_{n-2}^0)} \quad (10)$$

The encircled plus sign indicates the exclusive-OR function by which a 1 output is produced for 01 and 10 inputs and a 0 output otherwise.

A similar logic equation can be written to obtain $$c_n^0 = \overline{b_n^1 b_n^0} c_{n-2}^1 \overline{c_{n-2}^0} + \overline{b_n^1} b_n^0 c_{n-2}^1 c_{n-2}^0 + \overline{b_n^1} b_n^0 \overline{c_{n-2}^1 c_{n-2}^0} + \overline{b_n^1} b_n^0 \overline{c_{n-2}^1} c_{n-2}^0 + \overline{b_n^1} b_n^0 \overline{c_{n-2}^1} c_{n-2}^0 + b_n^1 b_n^0 \overline{c_{n-2}^1 c_{n-2}^0} \quad (11)$$

Equation (10) can also be simplfied to $$c_n^0 = \overline{b_n^1 b_n^0} c_{n-2}^1 + \overline{b_n^1} b_n^0 \overline{c_{n-2}^1} + b_n^0 \overline{c_{n-2}^0} (b_n^1 \oplus c_{n-2}^1). \quad (12)$$

Equation (10) and (12) are implemented in straightforward fashion as shown in FIG. 4, in which the four-rail binary inputs are converted to a two-rail condition. Equations (4) through (7) above are obtained by the same type of inductive analysis.

The paired binary-coded ternary digits $B_{2k-1}$ and $B_{2k}$ appearing on lead pairs 15A and 15B [lines (g) through (j) of FIG. 8] from the ternary converter of FIG. 3 are applied to AND-gates 51A through 51D, which are alternately enabled in pairs by the BCT/2 timing wave on lead 39 [line (f) of FIG. 8]. AND-gates 51A and 51B are enabled on the down stroke of the timing wave by way of inverter 53G and gates 51C and 51D, on the up stroke. The outputs of AND-gates 51A and 51C, containing alternately the $b_{2k-1}^1$ and $b_{2k}^1$ digits are combined in OR-gate 52A to form the $b_n^1$ digits at the system signaling rate. Similarly, the outputs of AND-gates 51B and 51D, containing the $b_{2k-1}^0$ and $b_{2k}^1$ digits, are combined in OR-gate 52B to form the $b_n^0$ digits at the system signaling rate. Thus, the outputs of OR-gates 52A and 52B contain the binary-coded ternary digits in two-rail serial fashion, as shown on lines (k) and (l) of FIG. 8.

Precoder 16 combines the $b_n^1$ and $b_n^0$ digits in logic fashion according to equations (10) and (12) with its own precoder outputs delayed by two system signaling intervals T to form present precoded digits $c_n^1$ and $c_n^0$, as shown on lines (n) and (o) of FIG. 8. Precoder 16 illustratively comprises a plurality of AND-gates 57 and 59, OR-gates 61, inverters 53 and 58, delay units 55 and 56, and exclusive-OR gates 54 as shown in FIG. 4. The effective inputs to precoder 16 are digits $b_n^1$, $b_n^0$, $c_{n-2}^1$ and $c_{n-2}^0$. Its outputs are $c_n^1$ and $c_n^0$ at OR-gates 61A and 61B. AND-gate 57A combines inverted digit $b_n^1$ with inverted digit $b_n^0$. The inverted digits are obtained from inverters 53A and 53B. AND-gate 57B combines digits $b_n^1$ and $b_n^0$ as shown. AND-gates 57C and 57D similarly combine $b_n^1$, $b_n^0$ and $b_n^0$, $c_{n-2}^0$. The $b_n^1 b_n^0$ output of gate 57A is combined with the $c_{n-2}^0$ digit in AND-gate 59A. Exclusive-OR gates 54A and 54B form the combinations $b_n^1 \oplus c_{n-2}^1$ and $c_{n-2}^1 \oplus c_{n-2}^0$, respectively. AND-gates 59B through 59F operate on their inputs to form the groups $\overline{b_n^1 b_n^0} c_{n-2}^0$, $b_n^1 b_n^0 \overline{(c_{n-2} \oplus c_{n-2}^0)}$, $\overline{b_n^1} b_n^0$, $b_n^0 \overline{c_{n-2}^0} (b_n^1 \oplus c_{n-2}^1)$, $b_n^1 b_n^0 c_{n-2}^1$ and $\overline{b_n^1} b_n^0 \overline{c_{n-2}^1}$, respectively, in a conventional manner. OR gate 61A combines the respective outputs of AND-gates 59A, 59B and 59C to form binary-precoded digit $c_n^1$. OR-gate 61B similarly combines the respective outputs of AND-gates 59D, 59E and 59F to form binary precoded digit $c_n^0$. The $c_n^1$ and $c_n^0$ outputs are connected by way of leads 62 and 63 to delay units 55 and 56 as shown to furnish the inputs $c_{n-2}^1$ and $c_{n-2}^0$ to the precoder itself.

Binary coded digits $c_n^1$ and $c_n^0$ from precoder 16 are further combined in linear adder 60 to form the ternary output digit $C_n$ on lead 19. Refer to line (p) of FIG. 8 for a representative $C_n$ wave.

The three-level $C_n$ wave in the output of adder 60, by operation of partial-response filter 20 and channel 22 thereon in accordance with equation (1), becomes the five-level wave $S_n$ on line 21 of FIG. 1. Passage through channel 22 also adds noise and distortion to its output on lead 23. A representative $S_n$ wave is shown on line (q) of FIG. 8. This wave is capable of interpretation modulo-three as shown on line (r) of FIG. 8. Waves $S_n$ and $S_n$ (mod 3) are equivalents. Positive levels 0, 1 and 2 are identical in both waves. However, levels (−1) and (−2) in the $S_n$ wave become by modulo-three excess levels (2) and (1), respectively, in the $S_n$ (mod 3) wave.

The receiver for the ternary transmission system of this invention operates on the received $S_n$ wave to restore the binary encoding, to partition the paired blocks properly and to decode the binary message wave. As shown in FIG. 1 the receiver comprises analog-to-digital converter 24, ternary converter 26, block-sync monitor 28, framing control 36, multilevel-to-binary converter 29, timing recovery circuit 34 and binary data sink 30.

Figure 5:
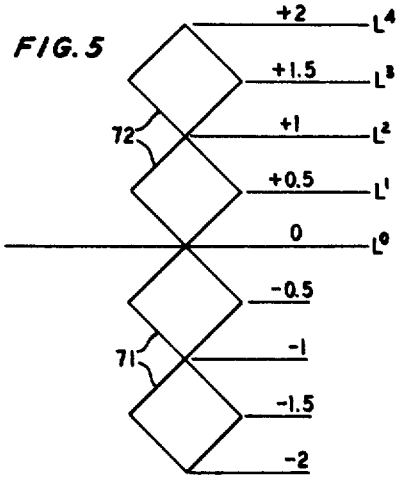
FIG. 5 is a simplified diagram of a five-level eye pattern useful in explaining the decoding operation of the data transmission system of this invention.

The received signal $S_n$ may be visualized from the section of an idealized eye pattern shown in FIG. 5. The eye pattern shown would be formed on an oscilloscope synchronized with the transmission rate of 72 kilobauds per second when a random message wave has successive periods superimposed. Diamonds 71 and 72 represent eye openings in which the vertical dimensions indicate amplitude decision margins and horizontal dimensions indicate sampling time margins. For the idealized wave shown sampling times should occur at the centers of the diamonds. For an individual sample the amplitude level would occur on only one of the integrally numbered levels. Slicing decision levels are those frictionally designated.

Analog-to-digital converter 24, under the control of a sampling wave at 72 kilohertz on lead 33 from timing recovery circuit 34, is effectively a multilevel slicer. The $S_n$ input wave on line 23 is applied in parallel to converter 24 and, by way of lead 32, to timing recovery circuit 34. Converter 24 first slices the incoming signal about the 0 level designated $L^0$ in FIG. 5 to determine the polarity of the sample. The wave is then folded by full-wave rectification for example, about the 0 level so that levels −2 and −1 are superimposed on levels +2 and +1 and sliced again at both the $L^1$ and $L^3$ levels. For each slice about the respective levels $L^0$, $L^1$ and $L^3$ positive or negative outputs are obtained depending on whether the signal sample falls above or below the respective slicing levels. It is apparent that if all three slicers yield logical one outputs level +2 was received, and if all three slicers yield logical zero outputs level 0 was received. A continuation of this analysis yields the following TABLE C.

[TABLE C

| Slicers | | | Received | Binary Code | |
|---|---|---|---|---|---|
| $L_n^0$ | $L_n^1$ | $L_n^3$ | Level | $b_n^1$ | $b_n^0$ |

-continued

| | | | | | |
|---|---|---|---|---|---|
| 0 | | 0 | 0 | 0 | 0 |
| 0 | 1 | 0 | −1 | 1 | 1 |
| 0 | 1 | 1 | −2 | 0 | 1 |
| 1 | 0 | 0 | 0 | 0 | 0 |
| 1 | 1 | 0 | +1 | 0 | 1 |
| 1 | 1 | 1 | +2 | 1 | 1] |

*TABLE C*

| *SLICERS* | | | *RECEIVED* | *BINARY CODE* | |
|---|---|---|---|---|---|
| $L_n^0$ | $L_n^1$ | $L_n^3$ | *LEVEL* | $b_n^1$ | $b_n^0$ |
| 0 | 0 | 0 | 0 | 0 | 0 |
| 0 | 1 | 0 | −1 | 1 | 1 |
| 0 | 1 | 1 | −2 | 0 | 1 |
| 1 | 0 | 0 | 0 | 0 | 0 |
| 1 | 1 | 0 | +1 | 0 | 1 |
| 1 | 1 | 1 | +2 | 1 | 1 |

Logical analysis of TABLE C yields the following equations:

$$b_n^1 = L_n^1 \cdot (\overline{L_n^0 \oplus L_n^3}) \quad (13)$$

$$b_n^0 = L_n^1 \quad (14)$$

Equations (13) and (14) are implemented in binary-coded ternary converter 26.

The binary digits on leads 27 are monitored in block-sync monitor 28 and are also decoded in multilevel-to-binary converter 29 to yield the original binary data train $a_m$ at the transmission rate of 108 kilobits per second for delivery to data sink 30. Block-sync monitor 28 detects the presence of the ternary pair 12 and sends an appropriate signal to framing control 36. Framing control 36 supplies both timing wave SCR and framing wave BCR/2 to binary converter 29 in the correct phase to decode the ternary digit pairs. It compares the occurrence of the violation pair 12 with the phase of the BCR/2 (36 kilohertz) wave. Each time this pair occurs at the wrong phase, i.e., within a partitioned pair, a counter is advanced. When the counter overflows, the phases of both the BCR/2 and SCR waves are shifted and the ternary pair is repartitioned. The counter avoids changing the timing on every occurrence of the violation pair, since a single occurrence may be due merely to channel noise.

Figure 6:
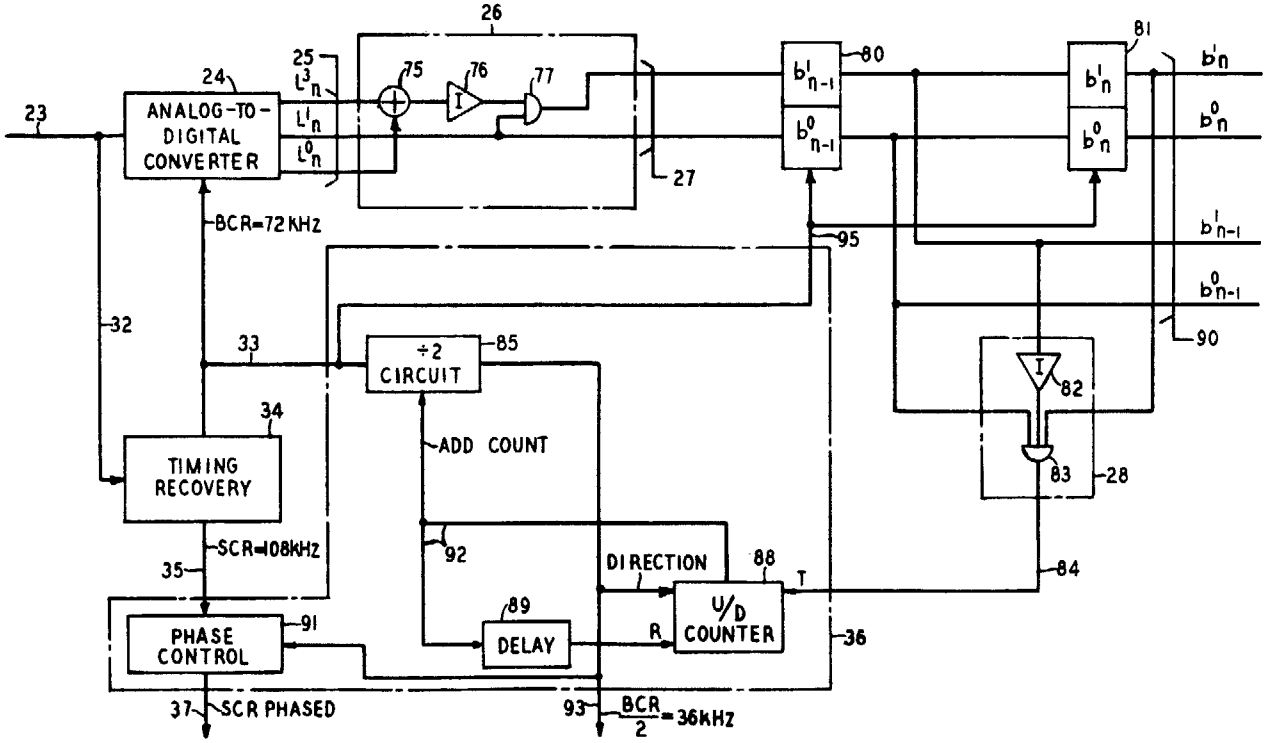
FIG. 6 is block diagram of a ternary block synchronizer useful in the practice of this invention.

FIG. 6 is a more detailed block diagram of an illustrative embodiment of blocks 26, 28 and 36 on FIG. 1. The received wave $S_n$ on lead 23 is sliced in analog-to-digital converter 24 to yield the outputs $L_n^0$, $L_n^1$ and $L_n^3$ on leads 25 as previously explained. The BCR wave at 72 kilohertz is recovered in timing recovery circuit 34 from the input wave on lead 32 in a conventional manner by counting down from a master oscillator at 432 kilohertz, for example. This oscillator is also counted down to generate the SCR wave at 108 kilohertz. The manner in which the phase of the master oscillator is controlled may, however, be accomplished more precisely as described in the copending application of J. G. Kneuer, Ser. No. 808,130 filed Mar. 18, 1969.

Binary-coded ternary converter 26 in FIG. 6 comprises exclusive-OR gate 75, inverter 76, and AND gates 77, 78 and 79, which together implement equations (13) and (14) in an obvious manner.

Consecutive binary-coded ternary digits appear on leads 27 and are applied to binary shift register pairs 80 and 81 as shown. These pairs, each containing separate storage cells for most and least significant binary parts of the encoded ternary digits, make available the present and immediately preceding digits simultaneously. These digits are provided on output leads 90, timed by the BCR wave on lead 95.

Proper data recovery requires a proper pairwise association of received ternary digits. The violation pair 12 is encoded in binary form as [$b_{n-0}$] $b_{n-1}^0 = b_n^1 = b_n^0 = 1$ *and* $b_{n-1}^1 = 0$. Therefore, the occurrence of this pair can be represented logically by Block Sync Information signal $$BSI = b_n^1 \cdot \overline{b_{n-1}^1} \cdot b_{n-1}^0. \quad (15)$$

Equation (15) is implemented in a straight-forward manner in broken line block 28, which comprises inverter 82 and AND-gate 83. Gate 83 combines digits $b_{n-1}^0$ and $b_n^1$ with inverted digit $b_{n-1}^1$ as shown. Line (s) of FIG. 8 shows the occurrence of the BSI signal for the representative example.

The BSI output on lead 84 is applied to framing control 36, which illustratively comprises as shown in FIG. 6 up-down counter 88, divider 85, delay unit 89 and phase control 91. In addition to the BSI signal on lead 84 block 36 is also supplied with the BCR and SCR timing waves on leads 33 and 35.

In operation up-down counter 88 is arranged to count on every occurrence of the BSI signal at input T. The direction of the count is determined by the BCR/2 wave obtained from divide-by-two circuit 85. If the BSI input occurs in the positive half-cycle of the BCR/2 wave, the count is down. If it occurs in the negative half-cycle, the count is up. Counter 88 overflows after a chosen number of up-counts without intervening down-counts. The overflow count is selected on consideration of the noise statistics of the channel and, by way of example, may be eight. At the time the overflow count occurs, an output appears on lead 92 which adds a count to divider 85, thus shifting the phase of BCR/2 by 180°. The phase of the SCR wave is changed to correspond to the new phase of the BCR/2 wave by phase control 91. Finally, the counter is reset to a reference state by way of delay unit 89. The phased SCR and BCR/2 waves are made available on leads 37 and 93.

In FIG. 8 on line (s) the left-hand BSI pulse is assumed to cause the overflow occurrence in time with the negative half-cycle of the BCR/2 wave on line (t). The BCR/2 wave is seen to shift by half a cycle. At the same time the SCR wave is shifted correspondingly. The remaining BSI pulses are coincident with the positive half-cycles of the BCR/2 wave and cause no phase shift therein. The recovered data to the left of the first BSI pulse is seen to be spurious, but that to the right is valid.

Figure 7:
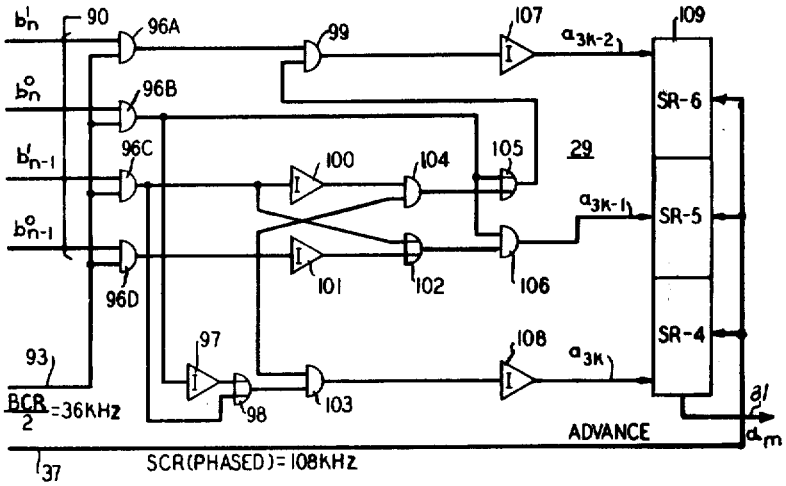
FIG. 7 is a logical block diagram of an illustrative embodiment of a ternary-to-binary decoder useful in the practice of this invention.

One function remains to be performed in the receiver and that is the conversion of the binary-encoded ternary digits properly partitioned to the serial binary state. This can be accomplished as shown in the illustrative embodiment of FIG. 7. Ternary-to-binary converter 29, as expanded in FIG. 7, illustratively comprises input AND-gates 96, logic circuitry including further AND-gates 99, 103, 104 and 106; OR-gates 98, 102 and 105, and inverters 97, 100 and 101; and shift register 109. The inputs include two simultaneously available binary-coded ternary digits on lead 90 from FIG. 6, the phased SCR wave on lead 37 and the phase-shifted BSR/2 wave on lead 93.

By analysis of TABLE A the following logic equations can be written for the binary digits $a_{3k}$, $a_{3k-1}$ and $a_{3k-2}$:

$$\overline{a}_{3k}=b_{n-1}^{0}\cdot(\overline{b_n^{0}}+b_{n-1}^{1}) \quad (16)$$

$$a_{3k-1}=b_n^{0}\cdot(b_{n-1}^{0}+b_{n-1}^{1}) \quad (17)$$

$$a_{3k-2}=b_n^{1}\cdot(b_n^{0}+b_{n-1}^{0}\cdot b_{n-1}^{1}) \quad (18)$$

In equations (16), (17) and (18) n replaces the 2k terms used in TABLE A for simplicity.

The binary inputs on leads 90 are admitted to the logic circuitry on the up strokes of the BCR/2 timing wave on line 93 at the rate of 36 kilohertz. The logic circuitry operates on these inputs to implement equations (16), (17) and (18) in a straightforward manner. The parenthetical term in equation (16) results from combining the $b_n^0$ digit inverted in inverter 97 with the direct $b_{n-1}^1$ digit in OR-gate 98 and this resultant is further combined in AND-gate 103 with the $b_{n-1}^0$ digit as shown to form the desired $a_{3k}$ output digit. Similarly, the parenthetical term in equation (17) is formed in OR-gate 102 by combining the $b_{n-1}^0$ digit inverted in inverter 101 with the direct $b_{n-1}^1$ digit as shown. This resultant is in turn combined in AND-gate 106 with the $b_n^0$ digit to form the desired $a_{3k-1}$ digit. In a similar manner the inverted $a_{3k-2}$ digit defined by equation (18) is formed by the indicated logical operations in inverter 100, AND-gate 104, OR-gate 105 and AND-gate 99 on the respective $b_{n-1}^1$, $b_{n-1}^0$, $b_n^0$, and $b_n^1$ input digits. In addition, the direct $a_{3k}$ and $a_{3k-2}$ digits are derived by inverting the outputs of AND-gates 103 and 99 in inverters 108 and 107 as shown.

The three parallel binary digits $a_{3k}$, $a_{3k-1}$ and $a_{3k-1}$ thus derived from the two parallel binary-coded ternary digits are applied simutaneously to the respective stages SR-4, SR-5 and SR-6 of conventional shift register 109 at the BCR/2 timing rate. These same digits are advanced from top to bottom of shift register 109 under the advance control of the SCR timing wave from lead 37 onto output lead 31 to reconstitute the original serial data train $a_m$. As shown in FIG. 1, this data train is delivered finally to data sink 30. Line (v) of FIG. 8 shows the reconstituted representative serial data train.

Although this invention has been disclosed in terms of a specific embodiment using a particular number of encoding levels and positive logic, it will be readily apparent to those skilled in the art that the principle of the invention is of much wider application.

What is claimed is:

1. Apparatus for communicating a binary data signal over a transmission channel of bandwidth W at an effective binary bit rate that is a nonintegral multiple of the channel symbol rate, comprising means for mapping each possible first block of binary digits taken m at a time into second blocks of n preassigned N-level digits such that $2^m$ is less than $N^n$ and there exists at least one unassigned N-level block, means for precoding N-level digits from said mapping means in accordance with the inverse of the impulse response of said channel such that precoded N-level digits can be decoded from single samples of the received signal, means for exciting said channel with precoded digits from said precoding means at a signaling rate of 2W symbols per second such that channel signals occupy (2N−1) levels, means for reconstructing said N-level digits from said channel signals, means for monitoring N-level digits from said reconstructing means for the presence of said unassigned N-level block therein and producing a framing control signal, means responsive to said framing control signal for partitioning reconstructed N-level digits into n-length blocks such that said unassigned block does not occur within partitioned blocks to be decoded, and means under the control of said partitioning means for translating partitioned blocks of N-level digits into a serial train of binary digits.

2. The apparatus of claim 1 in which m and N equal 3 and n equals 2 and there is only one unassigned three-level signal block.

3. Apparatus for communicating a binary data signal train to achieve an effective signaling rate of three bits per second per Hertz of bandwidth comprising means for mapping first blocks of serial binary data taken three digits at a time into preassigned second blocks of three-level digits taken two digits at a time, there being one unassigned three-level digit pair which can occur only between properly mapped second blocks, means for exciting a communication channel of limited bandwidth with said second blocks of digits at a symbol rate equal to twice the bandwidth of said channel, means at a receiver connected to said channel for recovering said three-level digits, means for monitoring pairs of three-level digits from said recovering means for the presence of said unassigned digit pair and generating a framing signal therefrom, means responsive to said framing signal for partitioning recovered three-level digits into pairs such that said unassigned pair occurs only as the last and first digit respectively of consecutive partitioned blocks, and means for decoding three-level digit pairs from said partitioning means into a serial binary data train.

4. Apparatus as defined in claim 3 in which said three-level digits are precoded before exciting said channel in accordance with the inverse of the impulse response of said channel.

5. Apparatus as defined in claim 3 in which said three-level digits are coded in two-rail binary form.

6. Apparatus as defined in claim 3 in which said partitioning means comprises a timing-wave source having a square-wave output at half the channel symbol rate, means jointly responsive to said timing-wave source and said framing signal for generating a first control output when said framing signal occurs during the first half-cycle of said timing wave and a second control output when said framing signal occurs during said second half-cycle thereof, a reversible counter controlled by first and second control outputs of said generating means, an excess of said second over said first control outputs yielding an overflow signal, and means responsive to said overflow signal for reversing the phase of said timing-wave output.

7. The method of communicating a binary data signal train in a precoded multilevel format to achieve an effective signaling rate of three bits per cycle of bandwidth of a communications channel comprising the steps of performing a serial to parallel conversion of serial binary data bits taken three at a time into first blocks, mapping said first blocks of binary data into second blocks of paired ternary digits, there being one nonallowed ternary pair which can only occur between valid second blocks, applying the ternary digits of said second blocks to said communications channel to form precoded multilevel signals at two-thirds the binary signaling rate, recovering at a receiver said ternary digits by a modulo-three reduction of said multilevel signals, monitoring pairs of recovered ternary digits for the occurrence of said nonallowed ternary pair, partitioning responsive to the occurrence of said nonallowed ternary pair said recovered ternary digits into valid second blocks, and decoding properly partitioned second blocks of ternary digits into first blocks of binary digits.

*8. A data transmission system having a carrier signal to be transmitted over a communication link, said system comprising:*

*means at a transmitter for grouping, into a multi-bit word, input binary data having a data rate defined by a given number of input bit periods per second with one data bit represented in each input bit period;*

*means responsive to said grouping means for generating a discrete signal level during at least a pair of modulation periods per multi-bit word for representing the identity of the multi-bit word, said signal generating means characterized by emitting a signal having a data bit-to-baud ratio of a mixed number and by emitting said discrete signal levels in a continuous sequence that represents a plurality of adjacent ones of said multi-bit data words;*

*means for modulating said carrier signal with said signal from said generating means; and*

*means at a receiver for deriving a clock signal from said signal that modulated the carrier, which clock signal is synchronized in time with the baud rate of said generating means at said transmitter.*

*9. A system in accordance with claim 8 wherein each multi-bit word comprises three binary bits and said mixed number bit-to-baud ratio is 1.5.*

*10. A system in accordance with claim 9 wherein the bits of binary values are identified by occupying one of two possible signal levels during sequentially-appearing input bit periods, and said generating means comprises an encoder employing a trinary format which comprises three signal levels and a modulation period equal to 1½ bit periods; said system comprising:*

*means modulating said carrier with a discrete signal level during a first modulation period of a pair of adjacent modulation periods for partially identifying the bits for a multi-bit word to be represented in that modulation period; and*

*means modulating a given signal level during the second modulation period of said pair for completing the identity of the bits of said multi-bit word.*

* * * * *